(12) United States Patent
Jiang et al.

(10) Patent No.: US 6,490,184 B2
(45) Date of Patent: Dec. 3, 2002

(54) AUXILIARY OUTPUT VOLTAGE CONTROL IMPLEMENTED WITH A BI-DIRECTIONALLY MAGNETIZING MAGNETIC AMPLIFIER

(75) Inventors: Jian Jiang, Shanghai (CN); Wei Chen, Shanghai (CN); Chau-Chun Wen, Shanghai (CN)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/811,117

(22) Filed: Mar. 16, 2001

(65) Prior Publication Data

US 2002/0131284 A1 Sep. 19, 2002

(51) Int. Cl.[7] .............................. H02M 5/42; H02M 1/00
(52) U.S. Cl. ......................................... 363/98; 363/21.1
(58) Field of Search .............................. 363/98, 97, 89, 363/21.01, 91, 131, 93

(56) References Cited

U.S. PATENT DOCUMENTS 4,642,743 A * 2/1987 Radcliffe ................. 363/21.07
4,811,187 A * 3/1989 Nakajima et al. ............. 363/25
5,612,862 A * 3/1997 Marusik et al. ............... 363/93

* cited by examiner

Primary Examiner—Rajnikant B. Patel
(74) Attorney, Agent, or Firm—Bo-In Lin

(57) ABSTRACT

The present invention discloses forward power converter. The power converter includes a transformer for transferring an input voltage from a primary side to a secondary side. The secondary side includes a main output voltage loop and at least one auxiliary output loop connected with a magnetic amplifier. A pulse width modulation (PWM) controller controls a switch on the primary side of the transformer for turning on the switch and turning off the main output voltage loop and the auxiliary output voltage loop for storing a magnetizing energy on windings of the secondary side. The magnetic amplifier includes a first and a second magnetization windings controlled by a first and a second control circuits respectively for providing a positive and negative magnetization current to carrying out a bi-directional magnetization process to achieve expanded load range operable for the forward power converter.

25 Claims, 6 Drawing Sheets

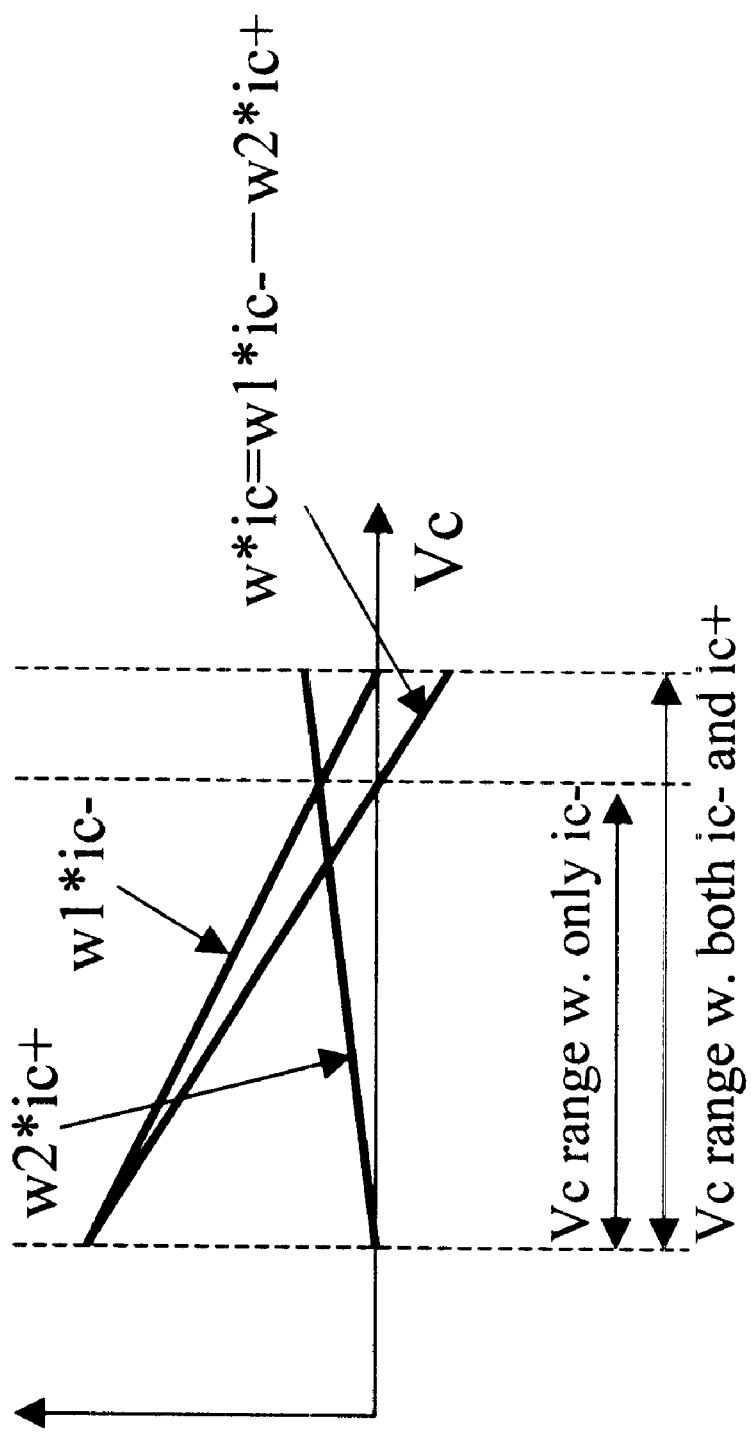
Fig. 3 Ampere-turn of magamp via Vc

US 6,490,184 B2

AUXILIARY OUTPUT VOLTAGE CONTROL IMPLEMENTED WITH A BI-DIRECTIONALLY MAGNETIZING MAGNETIC AMPLIFIER

BACKGROUND OF THE INVENTION

1. Field of the Invention

This invention relates generally to the circuit and methods for configuring and operating a switching power converter. More particularly, this invention relates to a bi-directional magnetization control circuit for magnetizing a magnetic amplifier for stabilizing an auxiliary output voltage of a power converter such that the converter can be applied to broader ranges of load imposed on the output terminals.

2. Description of the Prior Art

The magnetic amplifier is commonly implemented for controlling the auxiliary output voltage of a switching power converter. Referring to FIG. 1A for a forward power converter implemented with a magnetic amplifier in an auxiliary output power control. In a forward power converter, the energy is transferred from the primary side receiving an input voltage from a power source to the secondary side that carries a load. The energy transfer is achieved through the transformer under a condition of constant voltage. According to the duty cycle of the pulse width modulation (PWM) control circuit, a pulse width modulation (PWM) control performs the function of stabilizing the primary output voltage. Referring to FIG. 1B for more details of the operational cycles of the forward power converter. The current of the primary side of the transformer is ip. When the main switch S is turned off at a time point t3, the current ip drops down to zero, and the voltage Vg on the auxiliary output loop turns to a negative voltage between t3 to t1. During this time period, the magnetic amplifier control circuit carries out a magnetic reset of the magnetic amplifier. The total amount of magnetic reset energy stored into the magnetic amplifier is shown as the shadowed area having a volt-time integrated value of (V2−Vg)(t3−t1). At the time point t1, the main switch S is turned on, the voltage Vg turns into a positive voltage. Meanwhile, the magnetic amplifier, after the magnetic reset, has a high impedance. With the discharge current from the inductor L2, the diode D4 becomes conductive and the voltage V2 is clamped to a voltage of zero. The voltage Vg next to the magnetic amplifier performs a magnetizing function to the magnetic amplifier until the magnetic amplifier reaches a saturation state when Vg(t2−t1) is equal to (v2−Vg)*(t3−t1). When the magnetic amplifier reaches a saturation state, the magnetic amplifier presents a low impedance condition. The voltage V2 is raised to a level of Vg. For this reason, adjustment of a value of the magnetic reset volt-time integration, i.e., the value of (v2−Vg)*(t3−t1), of the magnetic amplifier can control the pulse width (t2−t1) of V2 and that can in turn control the output voltage. Under the condition when the load of the output loop implemented with the magnetic amplifier is increased, the output voltage is decreased with higher load. In order to compensate for the higher load to maintain a stable output voltage, the magnetic amplifier control circuit can increase the pulse-width of the voltage V2 by decreasing the time required for magnetic saturation. However, even if the magnetic amplifier has an output reset current of zero, a certain time duration would still be required for the magnetic amplifier to magnetize from a residual flux density Br to a saturation low-impedance condition as described above. A minimum magnetization time is therefore required and that minimum time duration can be represented as:

$$T\text{delay} = [N^*Ae^*(Bs-Br)]/V\text{exciting} \quad (1)$$

Where Bs is the saturation magnetic flux density, Br is the residual magnetic flux density, N is the number of windings of the magnetic amplifier and Ae is a cross-section area of the magnetic amplifier. When the load of the power converter is small, the duty cycle of the main switch is also reduced. However, if the time duration in which the main switch is kept on is small than a minimum magnetization time duration Tdealy as that shown in Equation (1), the magnetic amplifier will never be magnetized to a saturation state. Under that condition, the auxiliary output voltage loop will not able to function properly and the auxiliary output voltage will be reduced thus adversely affect the stability of the output voltage of the power converter. In other words, for the purpose of assuring a stable output voltage, the duty cycle of the main switch must be maintained at a value higher than a minimum duty cycle to satisfy the requirement derived from Equation (1). For that reason, when the magnetic amplifier is implemented in an auxiliary output loop as that shown in FIGS. 1A and 1B, a minimum load must be maintained. The minimum load must be higher than a specific value in order to maintain the duty cycle of the main switch higher than a minimum duty cycle. Thus, application of the power converter becomes less flexible because it can only be used to handle a load that is limited to a predetermined range.

Therefore, a need still exists for those of ordinary skill in the art to provide a new and improved power converter implemented with magnetic amplifier for providing a stabilized auxiliary power that can resolve the above-discussed technical limitations.

SUMMARY OF THE PRESENT INVENTION

It is therefore an object of the present invention to provide a novel and improved power converter implemented with control circuit for carrying out bi-directional magnetization for a magnetic amplifier to expand the range of load application of a forward converter employing a magnetic amplifier. A forward converter that enables a bi-directional magnetization of a magnetic amplifier significantly reduces the minimum magnetization time required for a magnetic amplifier. The converter thus allows a lower cycle duty of the main switch and that in turns expands the range of the load that is operable with the improved forward converter implemented with a magnetic amplifier. The new and improved forward converter implemented with a feature of bi-directional magnetization thus enable a person of ordinary skill in the art to resolve the above mentioned difficulties and limitations.

Specifically, magnetic amplifiers are implemented together with a pulse width modulation controller. The PWM controller is applied to control the main output voltage and the magnetic amplifiers are used to control the auxiliary output voltage such that stabilized output voltage is produced. For the purpose of expanding the operable range of the load processed by the magnetic amplifier, two magnetizing windings W1 and W2 are implemented with two control circuits are implemented to provide negative and positive magnetizing currents carry out a negative and positive magnetization. The limitation of keeping the load within a narrow range caused by inability to reach magnetic saturation condition as discussed above is therefore resolved.

Briefly, in a preferred embodiment, this invention discloses a power converter that includes a transformer for transferring an input voltage from a primary side to a secondary side. The secondary side includes a main output voltage loop and at least one auxiliary output loop connected with a magnetic amplifier. A pulse width modulation (PWM) controller controls a switch on the primary side of the transformer for turning on the switch and turning off the main output voltage loop and the auxiliary output voltage loop for storing a magnetizing energy on windings of the secondary side. The magnetic amplifier includes a first and a second magnetization windings controlled by a first and a second control circuits respectively for providing a positive and negative magnetization current to carrying out a bi-directional magnetization process to achieve expanded load range operable for the forward power converter.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 3 is a diagram for showing the variations of the ampere-turn product versus the voltage Vc outputted from a differential amplifier;

DETAILED DESCRIPTION OF THE INVENTION

Figure 1A:
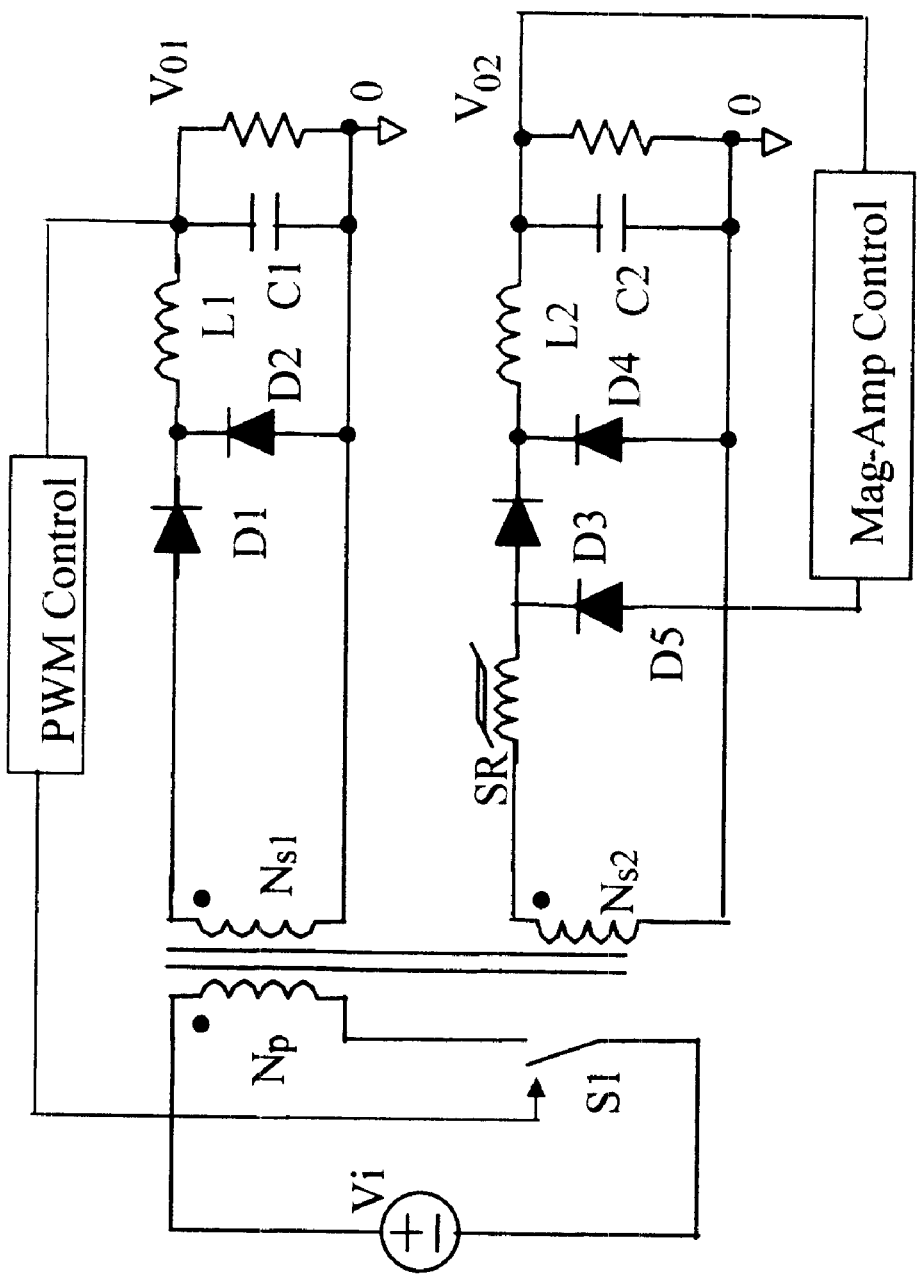
FIG. 1A is a circuit diagram for showing a conventional forward power converter implemented with a magnetic amplifier operated with single direction magnetic resetting.
Figure 1B:
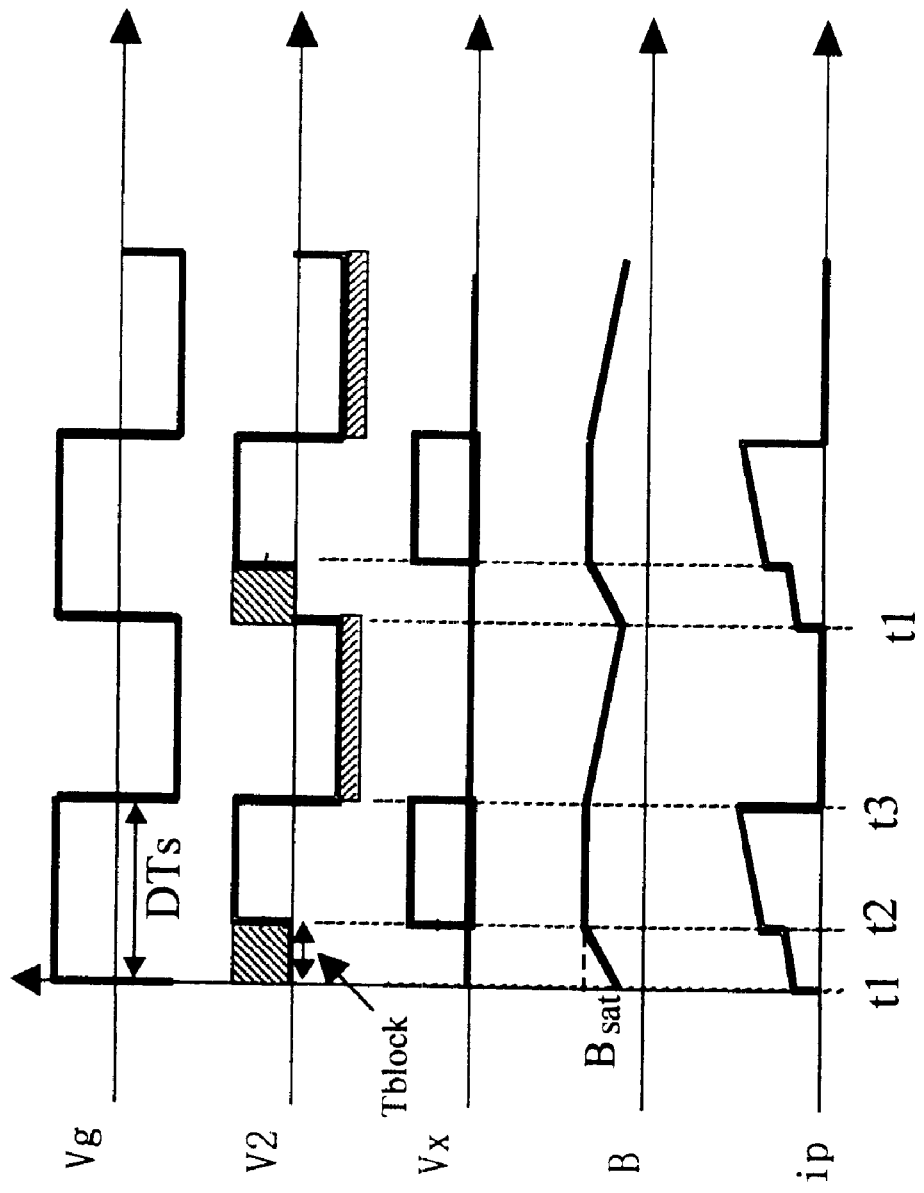
FIG. 1B is a wave-form to show the variations of voltages and values of volt-time for carrying out the magnetic reset and magnetization processes of a magnetic amplifier implemented to control an auxiliary output voltage.
Figure 2:
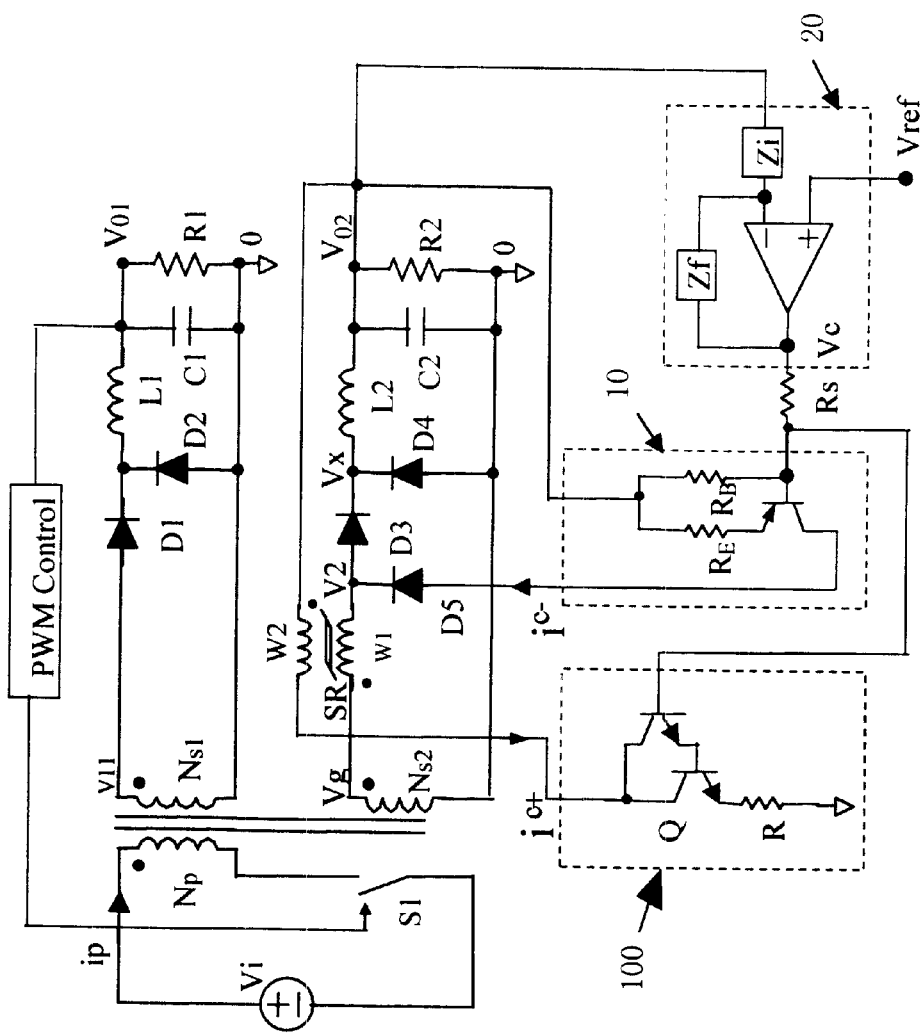
FIG. 2 is a circuit diagram for showing a new and improved forward power converter implemented with a magnetic amplifier operated with bi-direction magnetic resetting.

Referring to FIG. 2 for a forward power converter of this invention. The forward converter transfers the electrical energy from the primary side Np of a transformer to the secondary side Ns1 and Ns2. The primary output voltage Vo1 with the electrical power transferred from the first windings Ns1 is controlled by a pulsed width modulation (PWM) control that switches on and off a main switch S1. Coupling to the second windings Ns2 is an auxiliary output loop for providing an auxiliary output voltage Vo2. The auxiliary output voltage Vo2 is controlled by a magnetic amplifier that includes a first and second inductive winding W1 and W2 respectively. The inductive core of the inductor W1 for the magnetic amplifier is now controlled by a first control circuit 10 for negative-current ic– magnetization and the inductive core of the inductor W2 for the magnetic amplifier is now controlled by a second control circuit 100 for positive-current ic+ magnetization. The positive-current magnetization controller 100 includes a Darlington transistor Q combining a first and second transistors to receive a differential signal form a differential amplifier 20.

As the load is increased for the magnetic amplifier, the auxiliary output voltage Vo2 decreases. Consequently, the input Vo2 to the negative terminal of the comparator is smaller than the input to positive input terminal Vref and that leads to a higher output voltage Vc from the differential amplifier. A higher output voltage Vc from the differential amplifier causes a decrease in the negative current ic– and consequently W1*ic– for negatively magnetizing and for resetting the magnetic amplifier. Meanwhile, with higher Vc, the positive magnetization current ic+ and consequently W2*ic+ is increased for positively magnetizing the magnetic amplifier. The parameters W1 and W2 and the control circuit are designed to provide an operational characteristic that the net magnetizing ampere-turn product, i.e., $$Wic = [W1*ic-] - [W2*ic+]$$

is decreased when the Vc is increased. Thus the time to reach a magnetic saturation for the magnetic amplifier is shortened. The auxiliary output voltage V02 is increased to provide the stable value. With a bi-directional magnetization as disclosed in this invention, even when the negative current ic– decreases to zero when the auxiliary output voltage Vo2 is decreased below a threshold, the positive magnetization current ic+ can still be increased to further shortened the time required to reach a magnetic saturation. Therefore, the bi-directional magnetization circuit as disclosed is provided for properly operating the magnetic amplifier even with zero negative magnetizing current. Therefore, the load range of the output voltage is expanded. Furthermore, the bi-direction magnetization processes implemented with negative and positive magnetization currents controlled by the first and second controllers 10 and 100 enhance the stability of the output voltage.

Conversely, when the load for the magnetic amplifier is decreased, the auxiliary output voltage Vo2 is increased. The input voltage to the negative terminal of the comparator is greater than the input Vref to the positive terminal of the comparator. The output voltage Vc of the differential amplifier is decreased and the negative magnetization current ic– and consequently the ampere-turn product W1*ic– is increased for resetting the magnetic amplifier. With lower Vc, the positive magnetization current ic+ and consequently the ampere-turn product W2*ic+ for positively magnetizing the magnetic amplifier is decreased. The net resetting magnetizing ampere-turn product Wic=[W1*ic–]–[W2*ic+] is increased when Vc is decreased. The time to reach a magnetic saturation for the magnetic amplifier is lengthened. The auxiliary output voltage Vo2 is decreased to provide stable auxiliary output voltage. The limitation of the prior art in operating with limited range of load is therefore resolved. The range of the load that is operable for the new and improved forward power converter implemented with magnetic amplifier is therefore significantly increased. Referring to FIG. 3 for a diagram for illustrating the variations of the resetting ampere-turn product relative to a range of Vc. A comparison is made between the operation ranges for a forward power converter implemented with single-direction and bi-directional magnetization currents. A quantitative improvement can be clearly understood in visualizing from the diagram that as the load R2 is increase, the output voltage Vo2 is decreased and the output voltage from the differential amplifier Vc is increased. A higher Vc causes the negative ampere-turn product W1*ic– to decrease and the positive ampere-turn product W2*ic+ to increase. According to the circuit design, the net ampere-turn product Wic= [W1*ic–]–[W2*ic+] is decreased and the volt-time product for resetting the magnetic amplifier is shortened. The effective duty cycle of the magnetic amplifier is increased with a shorter magnetic saturation time. The increased effective duty cycle of the magnetic amplifier leads to a higher output voltage Vo2 thus provides a stabilized output voltage Vo2.

Figure 4A:
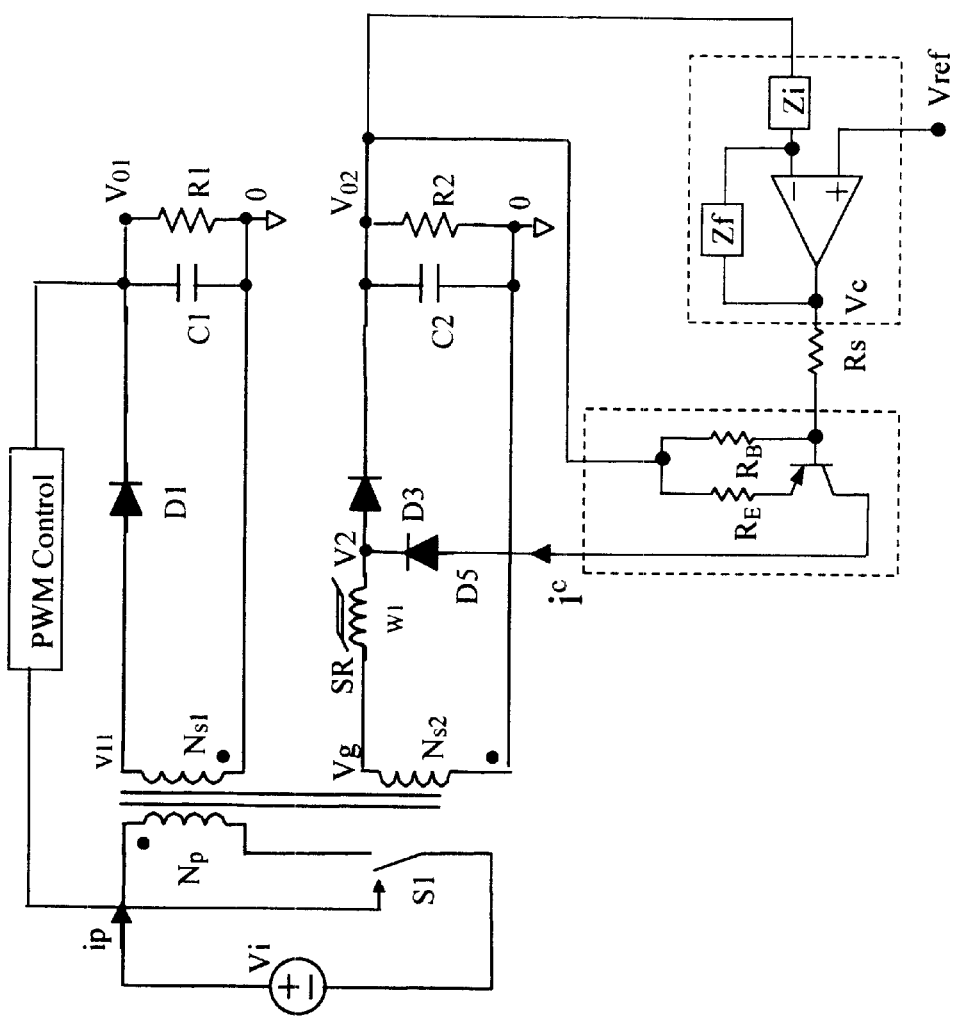
FIGS. 4A and 4B are circuit diagram of a flyback power converter implemented with magnetic amplifiers having respectively single-direction and bi-direction magnetic resetting circuits.
Figure 4B:
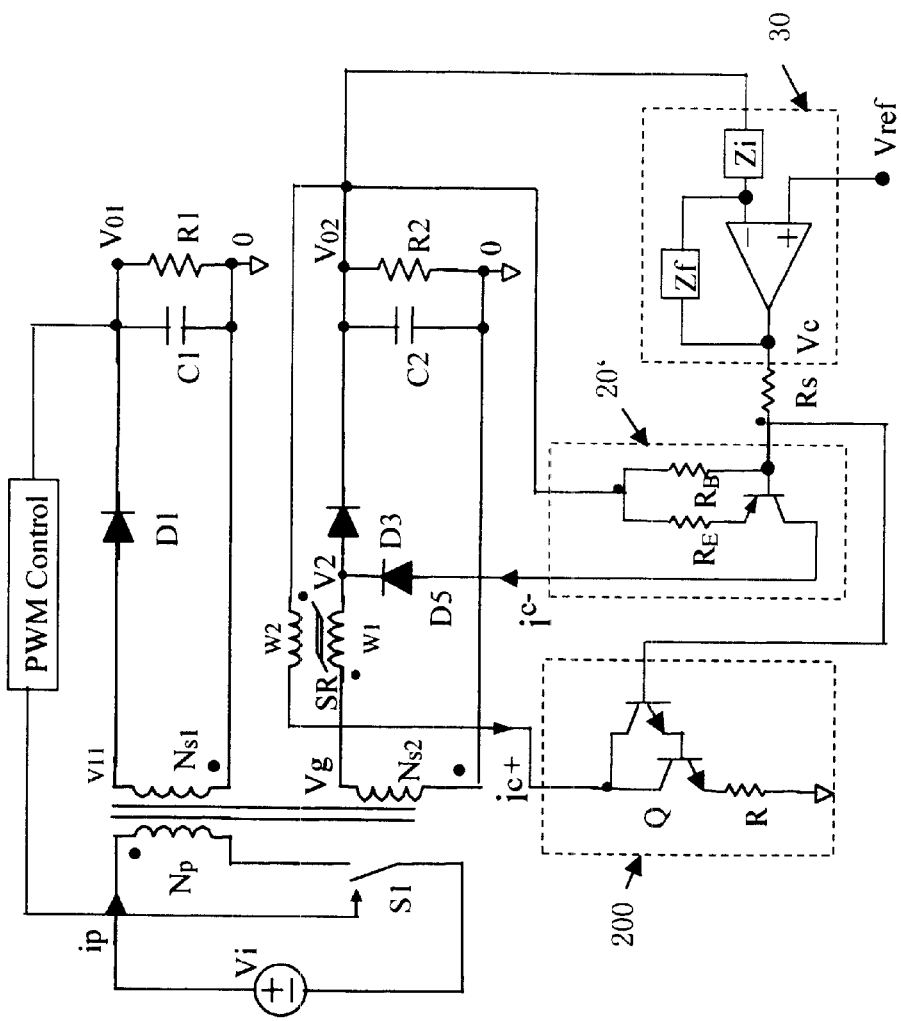

The bi-directional magnetization configuration as described above can also implement in a flyback power converter as that shown in FIG. 3B. Referring to FIG. 4A for a circuit diagram for flyback power converter that includes a magnetic amplifier in the secondary side for controlling the auxiliary output voltage. Similar to the forward power converter as that discussed above for FIGS. 2 and 3, the flyback power converter as shown in FIG. 4A is also limited by a single-direction magnetization of the magnetic amplifier. In FIG. 4B, the flyback power converter now further includes a positive magnetization current control circuit 200 in addition to the negative magnetization current control circuit 20'. Similar to that shown for the forward power converter, the positive magnetization current control circuit 200 includes a Darlington transistor Q combining a first and second transistors to receive a differential signal form a differential amplifier 30. The operation sequence and magnetization processes are similar to that described above. For the sake of clarity, these details are not repeated here. Because the circuit diagram and the discussion disclosed for the forward converter are sufficient to enable those of ordinary skill in the art to build the circuit to take advantage of the invention as now disclosed for both the forward and flyback power converters.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A power converter comprising:

a transformer for transferring an input voltage from a primary side to a secondary side wherein said primary side is implemented with a main switch;

said secondary side includes a main output voltage loop and an auxiliary output loop connected with a magnetic amplifier; and said magnetic amplifier includes a first and a second magnetization windings controlled by a first and a second control circuits each forming with said first and second magnetization windings a first and a second resetting loops respectively for providing a first direction resetting current in said first resetting loop and a second direction resetting current in said second resetting loop wherein said second direction resetting current opposite said first direction resetting current.

2. The power converter of claim 1 wherein:

said magnetic amplifier having an effective cycle duty for adjusting an auxiliary output voltage; and said first control circuit and second control circuit controlling said first and second direction resetting currents flowing through said first and second magnetization windings respectively for adjusting said effective cycle duty of said magnetic amplifier for adjusting and stabilizing said auxiliary output voltage.

3. The power converter of claim 1 further comprising:

a pulse width modulation (PWM) controller coupled between said primary side and said main output voltage loop for controlling said main switch on said primary side of the transformer for controlling a main output voltage of said main output voltage loop.

4. The power converter of claim 2 wherein:

said first and a second magnetization windings each having a W1 and W2 windings, where W1 and W2 are real numbers, for flowing said first and second direction resetting currents ic− and ic+ for generating an ampere-turn product W1*ic− and W2*ic+ in said first and second resetting loops respectively wherein said first and second control circuits controlling said ampere turn products in response to a load of said auxiliary output voltage loop for stabilizing said auxiliary output voltage.

5. The power converter of claim 4 wherein:

said first and second control circuits controlling said ampere-turn products of said first and second resetting loops for adjusting a magnetizing resetting time in response to said load of said auxiliary output voltage loop for adjusting said effective cycle duty of said magnetic amplifier to stabilize said auxiliary output voltage as said load of said auxiliary output voltage loop changes.

6. The power converter of claim 4 wherein:

said first and second control circuits controlling said ampere-turn products to increase and decrease a net ampere-turn product represented by Wic=(W1*ic−)−(W2*ic+) in response to an increase and decrease of said auxiliary output voltage respectively wherein W1 and W2 are number of windings of said first and second magnetization windings respectively and said ic− and ic+ are said resetting currents flowing through said first and second resetting loops respectively.

7. The power converter of claim 1 wherein:

said second control circuit further comprising a differential voltage amplifier for receiving an input voltage from said auxiliary output voltage loop for providing a differential control voltage to said first and second control circuits for controlling said first and second resetting currents flowing through said first and second resetting loops respectively.

8. A power converter comprising:

a transformer for transferring an input voltage from a primary side to a secondary side wherein said primary side further having a main switch;

said secondary side includes a main output voltage loop and an auxiliary output loop connected with a magnetic amplifier;

a pulse width modulation (PWM) controller for controlling said main switch on said primary side of the transformer for controlling a main output voltage of said main output voltage loop;

said magnetic amplifier includes a first and a second magnetization windings each having a W1 and W2 windings, where W1 and W2 are real numbers;

said magnetic amplifier further includes a first and a second control circuits each forming with said first and second magnetization windings a first and a second resetting loops respectively for controlling a first direction resetting current ic− in said first resetting loop and a second direction resetting current ic+ in said second resetting loop wherein said second direction resetting current ic+ opposite said first direction resetting current ic− for adjusting a net ampere-turn product as Wic=(W1*ic−)−(W2*ic+) in response to a load of said auxiliary output voltage loop for stabilizing said auxiliary output voltage.

9. The power converter of claim 8 wherein:

said second control circuit further comprising a differential voltage amplifier for receiving an input voltage from said auxiliary output voltage loop for providing a differential control voltage to said first and second control circuits for controlling said first and second resetting currents flowing through said first and second resetting loops respectively.

10. The power converter of claim 8 wherein:

said first and second control circuits controlling said ampere-turn products for adjusting a magnetizing resetting time in response to said load of said auxiliary output voltage loop for adjusting an effective cycle duty of said magnetic amplifier to stabilize said auxiliary output voltage as said load of said auxiliary output voltage loop changes.

11. The power converter of claim 8 wherein:

said first and second control circuits controlling said ic− and ic− in said first and second resetting loops respectively for controlling said net ampere-turn product represented by Wic=(W1*ic−)−(W2*ic+) to increase and decrease in response to an increase and decrease of said auxiliary output voltage respectively.

12. The power converter of claim 9 wherein:

said first and second control circuits further applying said differential control voltage from said differential voltage amplifier for controlling said ic− and ic− in said first and second reseting loops respectively for increasing and decreasing said net ampere-turn products in response to an increase and decrease of said auxiliary output voltage respectively.

13. A magnetic amplifier implemented in a power converter implemented with a main switch comprising:

a first and a second magnetization windings and a means for resetting said magnetic amplifier having a first and a second control circuits each connected to said first and second magnetization windings to form a first and a second resetting loops respectively for providing a first direction resetting current in said first resetting loop and a second direction resetting current in said second resetting loop wherein said second direction resetting current opposite said first direction resetting current.

14. The magnetic amplifier of claim 13 wherein:

said first and second control circuits further providing said first direction resetting current in a first period when said main switch is turned off and a second direction resetting current opposite said first direction resetting current in a second period when said main switch is turned on.

15. The magnetic amplifier of claim 14 wherein:

said first control circuit and second control circuit controlling said first and second direction resetting currents flowing in said first and second resetting loops through said first and second magnetization windings respectively for adjusting an effective cycle duty of said magnetic amplifier.

16. The magnetic amplifier of claim 14 wherein:

said first and a second magnetization windings each having a W1 and W2 windings, where W1 and W2 are real numbers, for flowing said first and second direction resetting currents ic− and ic+ in said first and second resetting loops for generating an ampere-turn product W1*ic− and W2*ic+ respectively wherein said first and second control circuits controlling said ampere turn products.

17. The magnetic amplifier of claim 16 wherein:

said first and second control circuits controlling said ic− and ic− in said first and second resetting loops respectively for controlling said ampere-turn products for adjusting a magnetizing resetting time of said magnetic amplifier for adjusting said effective cycle duty of said magnetic amplifier.

18. The magnetic amplifier of claim 16 wherein:

said first and second control circuits controlling said ic− and ic− in said first and second resetting loops respectively for controlling said ampere-turn products to increase and decrease a net ampere-turn product represented by Wic=(W1*ic−)−(W2*ic+).

19. A method for implementing a magnetic amplifier in a power converter implemented with a main switch comprising a step of:

conducting a first resetting current in a first resetting loop and a second resetting current in a second resetting loop for resetting said magnetic amplifier.

20. The method claim 19 wherein:

said step of resetting said magnetic amplifier further comprising step of providing a first and second magnetic windings and controlling said first and second magnetic windings with a fist and second control circuits each connected to said first and second magnetization windings to form a first and a second resetting loops respectively for providing a first direction resetting current in said first resetting loop and a second direction resetting current in said second resetting loop wherein said second direction resetting current opposite said first direction resetting current respectively.

21. The method of claim 20 wherein:

said step of controlling said resetting currents flowing through said first and second magnetization windings further comprising a step of adjusting said first resetting current in said first resetting loop and said second resetting current in said second resetting loop for controlling an effective cycle duty of said magnetic amplifier for adjusting and stabilizing an auxiliary output voltage of said power converter.

22. The method of claim 20 wherein:

said step of providing said first and a second magnetization windings further comprising a step of providing each of said windings having a W1 and W2 windings, where W1 and W2 are real numbers, for flowing said magnetization currents ic− and ic+ in said first and second resetting loops respectively for generating an ampere-turn product W1*ic− and W2*ic+ respectively for enabling said first and second control circuits to control said ampere turn products in response to a load of said auxiliary output voltage loop of said power converter for stabilizing said auxiliary output voltage.

23. The method of claim 20 wherein:

said step of providing said first and a second magnetization windings further comprising a step of providing each of said windings having a W1 and W2 windings, where W1 and W2 are real numbers, for flowing a negative and positive magnetization currents ic− and ic+ for generating an ampere-turn product W1*ic− and W2*ic+ respectively for enabling said first and second control circuits to control said ampere turn products in response to a load of said auxiliary output voltage loop for stabilizing said auxiliary output voltage.

24. The method of claim 23 wherein:

said step of adjusting an effective cycle duty of said magnetic amplifier further comprising a step of controlling said ic– and ic– in said first and second resetting loops respectively for controlling said ampere-turn products for adjusting a magnetizing resetting time of said magnetic amplifier in response to said load of said auxiliary output voltage loop for adjusting said effective cycle duty of said magnetic amplifier.

25. The method of claim 23 wherein:

said step of generating said ampere-turn products further comprising a step of controlling said ic– and ic– in said first and second resetting loops respectively for increasing and decreasing a net ampere-turn product represented by $Wic = (W1 \ast ic-) - (W2 \ast ic+)$ in response to an increase and decrease of said auxiliary output voltage respectively.

* * * * *